United States Patent
Andersson

[11] Patent Number: 6,143,993
[45] Date of Patent: Nov. 7, 2000

[54] SHEAR BEAM LOAD CELL

[75] Inventor: Göran Andersson, Karlskoga, Sweden

[73] Assignee: Nobel Elekronik AB, Karlskoga, Sweden

[21] Appl. No.: 09/142,224

[22] PCT Filed: Mar. 11, 1997

[86] PCT No.: PCT/SE97/00404

§ 371 Date: Dec. 23, 1998

§ 102(e) Date: Dec. 23, 1998

[87] PCT Pub. No.: WO97/35169

PCT Pub. Date: Sep. 25, 1997

[30] Foreign Application Priority Data

Mar. 18, 1996 [SE] Sweden ................................. 9601014

[51] Int. Cl.[7] ................................. G01G 3/08; G01L 1/04
[52] U.S. Cl. ................ 177/229; 73/862.471; 73/862.639
[58] Field of Search ................................ 177/229, DIG. 9, 177/238, 239, 211, 244; 73/862.471, 862.472, 862.473, 862.474, 862.632, 862.633, 862.637, 862.638, 862.639

[56] References Cited

U.S. PATENT DOCUMENTS

| | | | |
|---|---|---|---|
| 3,284,749 | 11/1966 | Fouretier | 73/862.627 |
| 3,554,025 | 1/1971 | Andersson et al. | 73/141 |
| 3,741,327 | 6/1973 | Nordstrom et al. | 177/163 |
| 3,741,328 | 6/1973 | Andersson et al. | 177/210 |
| 3,960,228 | 6/1976 | Nordstrom | 177/211 |
| 4,237,727 | 12/1980 | Lockery et al. | 73/141 A |
| 4,516,646 | 5/1985 | Bergfalk | 177/211 |
| 4,549,622 | 10/1985 | Leiman | 177/134 |
| 4,666,006 | 5/1987 | Wernimont | 177/211 |
| 4,744,254 | 5/1988 | Barten | 73/862.66 |
| 5,024,107 | 6/1991 | Bethe | 73/862.65 |
| 5,308,933 | 5/1994 | Ahl | 177/135 |
| 5,419,210 | 5/1995 | Haker | 73/862.631 |
| 5,859,391 | 1/1999 | Von Hertling et al. | 177/229 |
| 6,005,199 | 12/1999 | Harada et al. | 177/211 |

FOREIGN PATENT DOCUMENTS

| | | |
|---|---|---|
| 0 251 175 A2 | of 1988 | European Pat. Off. . |
| 21 17 805 B2 | of 1975 | Germany . |
| 29 32 597 C2 | of 1984 | Germany . |
| 311 573 | of 1969 | Sweden . |
| 438 733 | of 1985 | Sweden . |

*Primary Examiner*—Randy W. Gibson
*Attorney, Agent, or Firm*—Pollock, Vande Sande & Amernick, R.L.L.P.

[57] ABSTRACT

A shear beam load cell comprising a cantilevered beam member (1) for measuring the shear force imposed on the beam member by the load (F) to be measured and one or more strain gauges mounted on the beam member so that they are affected by the deformation in the beam material. The free deflectable end portion (2) of the beam (1) has a section (10) with reduced material thickness, the upper side of this section being located substantially along the longitudinal neutral axis of the beam and defining a load application surface (11) for the load (F) to be measured. The load application surface (11) has a longitudinal extension, along the neutral axis or its extension, so that the point-of-load application for the load (F) to be measured can be moved along the load application surface in case of thermal expansions due to temperature variations in a tank, weighing container, foundation or the like.

9 Claims, 2 Drawing Sheets

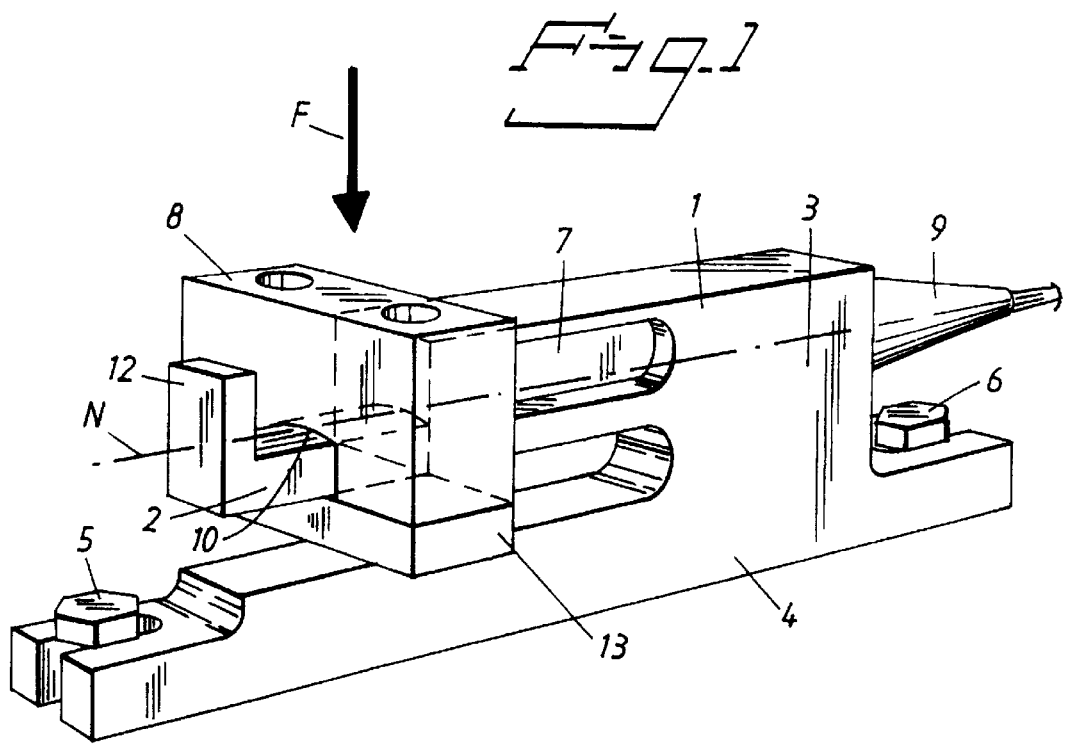
Fig.1
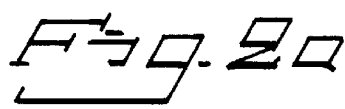
Fig.2a
Fig.2b
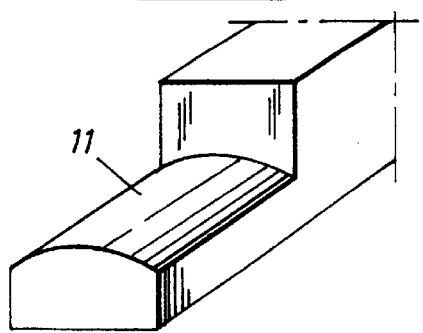
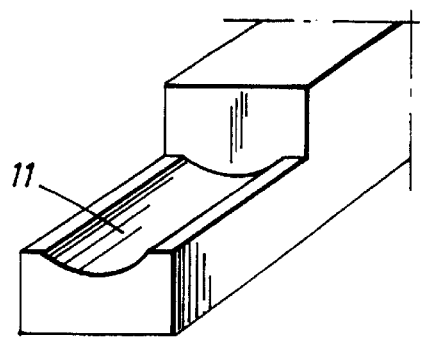
Fig.2c
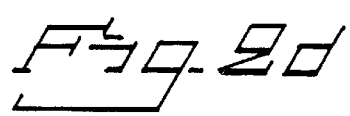
Fig.2d
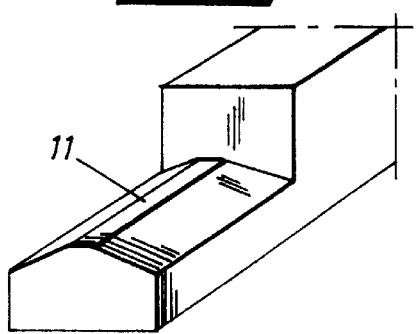
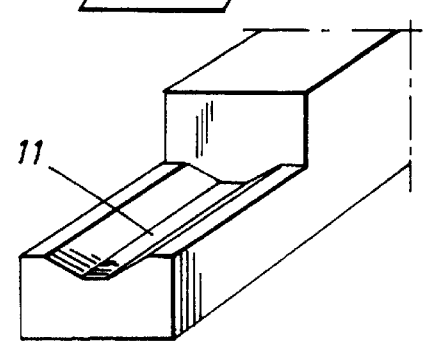

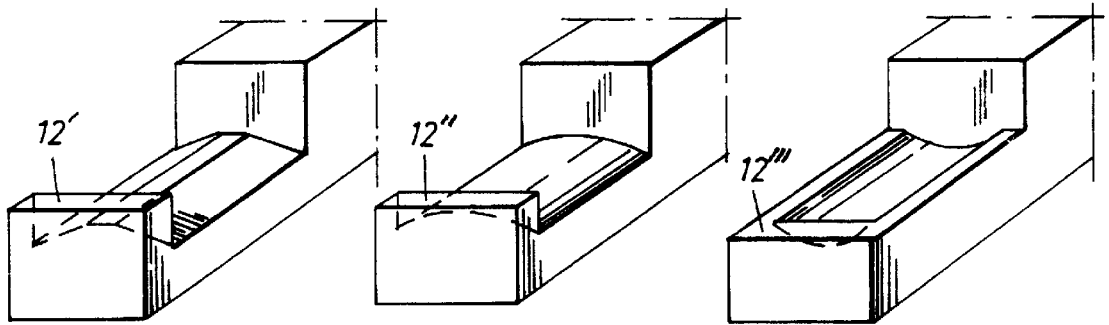
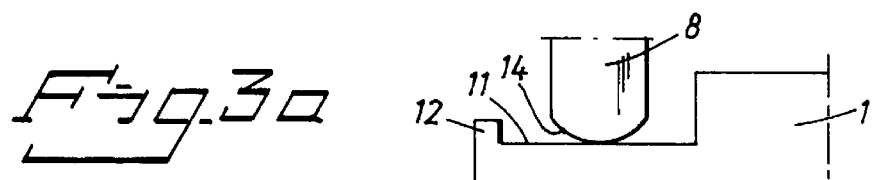
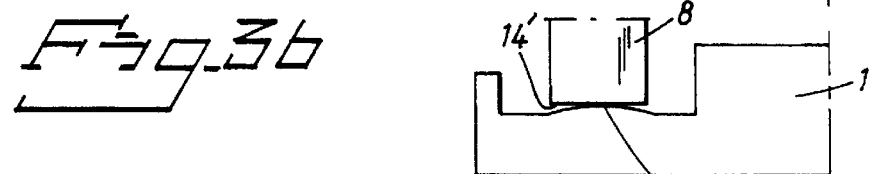
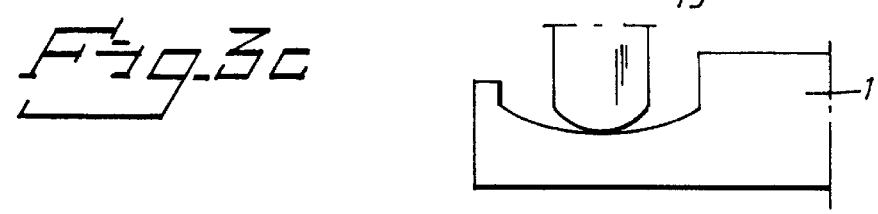
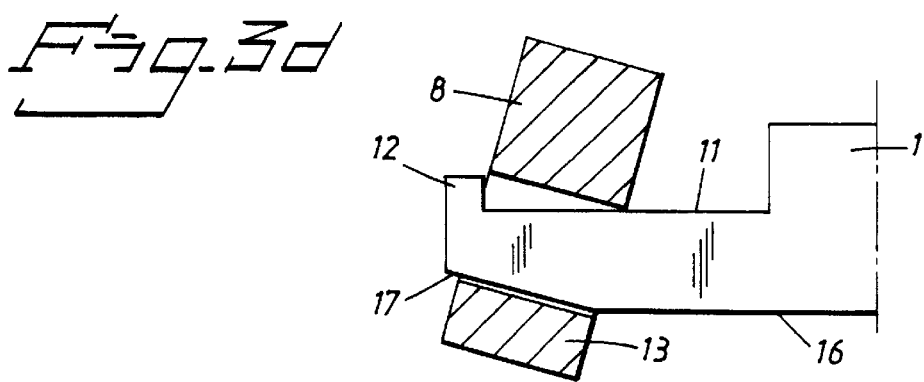

SHEAR BEAM LOAD CELL

FIELD OF THE INVENTION

The present invention relates to a load cell of the shear beam type including a beam member for measuring the shear force imposed on the beam member by the load to be measured and one or more strain gauges mounted on the beam member so that they are affected by the deformation in the beam material.

BACKGROUND OF THE INVENTION

It is previously known to use beam-shaped load cells or force transducers based on resistive strain gauges in electronic weighing equipment of various types. The reason for this is that this type of load cell has proved to be very reliable and they have also the ability to maintain calibration and reproduction data for a long time and under severe weighing conditions. The beam-shaped load cells are also comparatively small in size, which makes them suitable for built-in and low-profile weighing applications. The load cells are usually cylindrical and when they are installed they can therefore often replace an existing shaft or any other machine element in order to sense a strain or measure a load without requiring any modification of the equipment in which they are installed.

A significant quality of shear beam type load cells is the ability to withstand side forces, that is, forces acting in directions other than in the measuring direction of the load cell. The load cells do not require any side supporting means, they can withstand side forces up to 100–200% of the nominal load value.

However, a load cell can also be affected by other undesired forces and as is usual in measuring applications it is the temperature and specifically temperature variations that cause measuring errors. Of course the strain gauges which are used in the load cell have themselves a certain temperature dependence caused by the fact that the measuring element and the resistive wire have different thermal expansion coefficients. If, however, at least four strain gauges are used and if they are of the same kind and glued on the same material, then the changes in resistance caused by the temperature variations will be the same for each of the strain gauges. As the strain gauges are arranged in a bridge circuit, the balance of the bridge will not be changed.

Undesired load forces affecting the measuring accuracy are also caused by, for instance, temperature expansions in the weighing container or platform. For that reason the load cell is usually provided with a bearing or other type of embodiment for eliminating these types of disturbing forces, such as side forces or twisting moments of torsion.

Swedish patent 82 01365-7 discloses a cylinder-shaped load cell with such a built-in bearing for permitting a side movement of the measuring body on a plane base support member. The load cell can be positioned directly on a foundation or other base support member in such a manner that it is permitted to move in a side direction. By means of such a built-in bearing the load cell can be loaded via a loading bracket without any additional bearings required.

In many applications, however, these types of movements on a plane foundation or base support member are not permitted by the actual design of the weighing equipment. Furthermore, the bearing built into the cylinder-shaped measuring body makes this type of load-cell comparatively expensive. The built-in bearing, in the form of, for instance, slide bearing or a roll bearing, must be designed with a high degree of accuracy and withstand the often very heavy load forces which are applied to this type of load cell.

Another type of prior art load cell is disclosed in U.S. Pat. No. 3,960,228. This load cell has a free deflectable beam secured to a foundation or other mounting means in such a manner that the free deflectable weigh end of the beam is suitably supported for receiving a vertical load force to be measured. The strain gauges are positioned on opposite sides of the beam and orientated substantially at a 45° angle to the longitudinal neutral axis of the beam. A recess is formed in the free end of the deflectable beam in the load-measuring direction so that the vertical force of the load is applied on a load bearing surface within the recess. The load bearing surface within the recess is located close to the longitudinal neutral axis of the shear beam so that the moment arm and the twisting moment of an adverse side force affecting the shear beam are minimized. Thus, in this type of load cell the measurement inaccuracy, due to imperfect positioning of the strain gauges on opposite sides of the shear beam, is reduced.

Also, in the case of a precise positioning of the two opposite strain gauges, this arrangement does not solve the problems, however, due to thermal expansion in the weighing container or weighing platform. The shear beam is secured to a foundation or the like and is not permitted any movement for compensating for such thermal expansions.

Swedish patent 311 573 discloses a load cell in the form of a shear beam, in which the free deflectable end of the shear beam is fastened to one end of a second beam extending parallel to and freely at the side of the first beam. The second beam is shorter than the first beam and, the free end of the second beam provides the receiving surface for the load force to be measured. This second beam is preferably made as a sleeve member freely enclosing the first beam.

One important advantage of such an arrangement is the fact that the load cell is substantially insensitive to any change in point-of-load application. Specifically, any changes of the point-of-load application due to thermal expansion in a weighing container or a weighing foundation affect the result of the measurement only to a very small degree.

Even if this type of load cell with a second sleeve enclosing the first shear beam has this important advantage it should be understood that this type of load cell is more expensive in construction. Therefore, a load cell is desired which is more simple in construction.

SUMMARY OF THE INVENTION

The object of the present invention is to provide a shear beam load cell which is simpler in construction but which is very insensitive to undesired forces, such as adverse side forces and twisting moments as well as thermal expansions.

According to the invention the free end of the shear beam has a section with reduced material thickness, the upper surface of this section is located substantially along the longitudinal neutral axis of the shear beam and provides the surface upon which the load to be measured is applied. This surface could be a plane surface, convex, concave or the like, but the surface upon which the load is applied should have an extension in the longitudinal direction, that is, in the direction of the neutral axis, so that the point-of-load application could be moved along the surface in case of thermal expansions.

Preferably, the load force is applied by means of a U-shaped loading bracket which is supported on the surface and which is movable along the surface in case of thermal expansions. In one preferred embodiment, the loading bracket is closed to provide at the same time a tilting stop.

The load application surface is preferably provided with a gliding stop outermost on the beam to limit the movement along the surface for the load supporting bracket or the like.

BRIEF DESCRIPTION OF THE DRAWINGS

In the following the invention will be described more in detail with reference to the accompanying drawings which are illustrating some examples of the shear beam.

FIG. 1 is a perspective view of a load cell according to the present invention provided with a load supporting, closed bracket, FIG. 2 illustrates some examples how the load application surface could look like and FIG. 3 illustrates some examples of how the loading bracket can be connected to the load application surface of the shear beam.

DETAILED DESCRIPTION OF THE INVENTION

The load cell illustrated in FIG. 1 generally comprises a beam member 1 having a free deflectable end portion 2 and a mounting end portion 3 which is in integral connection with a plate support section 4 fastened to a foundation or the like by means of bolts 5, 6. Recesses 7 are formed on opposite sides of the free deflectable part of the cantilevered beam member for defining a symmetrical, substantially I-shaped transverse cross-section. Strain gauges are mounted in the recesses in a known manner for measuring the shear strain caused by a load F applied to the free deflectable end portion 2 of the beam by means of a loading bracket 8. In the example, the beam member 1 has the general configuration of a parallelepiped, but it should be understood that the beam be cylindrical.

The mounting end portion 3 has a cable connection 9 for the strain gauges. The strain gauge arrangement per se is conventional, however, and will not be described in any detail here.

From FIG. 1 it can be seen that the free deflectable end portion 2 of the beam has a section 10 with reduced material thickness. Specifically, on the upper side of the free deflectable beam portion material has been milled or cut away so that a load application surface 11 is formed, which surface is located along the longitudinal neutral axis N of the beam. As already mentioned in the introductory portion of the specification it is an advantage if the point-of-load application is located on the neutral axis of the beam.

According to the present invention, the load application surface has a longitudinal extension, along the neutral axis of the beam or its extension, so that the point-of-load application can be moved along the surface. This is the case if the loading bracket 8 is connected to a load which is affected by thermal expansion. The loading bracket 8 will then slide along the surface 11. The beam has a sliding or security stop 12 to limit the magnitude of the longitudinal movement. The U-shaped loading bracket 8 is closed by means of a bottom member 13 so that the loading bracket also has the function of a tilting stop protection.

The load application surface has a somewhat rounded profile. In FIG. 2 it is illustrated some examples with different profiles for the load application surface. FIG. 2a shows a convex, somewhat rounded load application surface, FIG. 2b a corresponding concave profile, FIG. 2c a trapezoidal, convex profile, FIG. 2d a corresponding concave profile and FIGS. 2e, 2f, and 2g illustrating the same surfaces but together with sliding stops 12', 12" and 12'".

As already mentioned the loading bracket is preferably closed so that it also can prevent a possible tipping motion. Its contact surface 14 against the load application surface can be curved in the longitudinal direction of the load application surface, as indicated in FIG. 3a, as well as perpendicular to the longitudinal direction of the load application surface, as indicated in FIG. 1. The curved contact surface 14 in FIG. 3a reduces the contacting surface against the load application surface and thereby also the friction, which is an advantage. One alternative embodiment for reducing the friction is illustrated in FIG. 3b. In this case the loading bracket has a plane contact surface 14', seen in the longitudinal direction of the load application surface, while the load application surface itself has a small elevation 15 in its mid-section.

In certain cases it could be an advantage if the loading bracket maintains a stable position on the midsection of the load application surface of the mesuring beam. In FIG. 3c it is illustrated how the load application surface in its longitudinal direction has been made somewhat concave so that the loading bracket tends to be retained in a stable neutral position. It should be appreciated that the elevation 15 as well as the concavity in FIG. 3c are comparatively small so that the load application surface is still located substantially in a plane in the longitudinal direction of the neutral axis of the measuring beam.

The load to be measured could for instance be a tank or a large container which is affected by thermal expansions. The loading bracket 8 is then secured to the supporting leg of the tank and arranged in a vertical, natural working position along the load application surface 11 and from which position it is prevented to deviate by means of its bottom member 13. This bottom member prevents the loading bracket from leaving the load cell even in case of lifting forces, due to for instance heavy winds on an outdoor tank or container. In order to at all allow such a closed loading bracket the underside 16 of the outermost portion of the measuring beam section with reduced material thickness has a straight or rounded bevelled portion 17. Thanks to this bevelled portion the loading bracket can be put on to the beam under an angle and then put into a vertical position in which the loading bracket has a vertical play which is less than the height of the gliding stop 12.

The invention is not limited to the illustrated embodiments but can be varied within the scope of the accompanying claims.

What is claimed is:

1. A shear beam load cell, comprising:
   a shear beam member comprising a mounting end portion and a free deflectable end portion,
   the free deflectable end portion having an upper load application side, a lower side, and side surfaces, at least one strain gauge being mounted on the side surfaces so as to be affected by deformation of the free deflectable end portion of the shear beam member;
   the free deflectable end portion including a section of reduced thickness on the upper side with a load application surface being located thereon, the load application surface being arranged substantially along a longitudinal neutral axis of the shear beam member and having a longitudinal extension that permits a point-of-load application of a load force to be moved along the load surface as a result of thermal expansion in a weighing container or foundation.

2. The shear beam load cell according to claim 1, wherein the shear beam member further comprises a glide stop protection arranged at an end of the free deflectable end portion of the shear beam for limiting a magnitude of movement of the point of load application of the load force on the load application surface.

3. The shear beam load cell according to claim 1, wherein the load application surface has a rounded, convex profile.

4. The shear beam load cell according to claim 1, wherein the load application surface has a trapezoidal, convex profile.

5. The shear beam load cell according to claim 1, wherein the load application surface has a rounded, concave profile.

6. The shear beam load cell according to claim 1, wherein the load application surface has a trapezoidal, concave profile.

7. The shear beam load cell according to claim 1, further comprising:

a U-shaped contact bracket for applying the load force to the free deflectable end portion of the shear beam, the contact bracket comprising a contact surface between two legs, the contact surface of the bracket engaging the load application surface of the shear beam.

8. The shear beam load cell according to claim 7, wherein the loading bracket further comprises a bottom member providing a closed design and tiling stop protection to the bracket.

9. The shear beam load cell according to claim 8, wherein an underside of the section of reduced thickness of the free deflectable end portion includes an outer beveled portion for permitting placement of the loading bracket onto the beam at an angle before placement in a vertical load application position.

* * * * *